(12) United States Patent
Emrick et al.

(10) Patent No.: US 8,158,742 B2
(45) Date of Patent: *Apr. 17, 2012

(54) DEOXYBENZOIN-BASED ANTI-FLAMMABLE POLYPHOSPHONATE AND POLY(ARYLATE-PHOSPHONATE) COPOLYMER COMPOUNDS, COMPOSITIONS AND RELATED METHODS OF USE

(75) Inventors: Todd Emrick, Deerfield, MA (US); Thangamani Ranganathan, San Jose, CA (US); E. Bryan Coughlin, Amherst, MA (US); Richard J. Farris, Leeds, MA (US); Joseph Zilberman, Haifa (IL)

(73) Assignee: University of Massachusetts, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,703

(22) Filed: Jan. 3, 2011

(65) Prior Publication Data

US 2011/0098408 A1  Apr. 28, 2011

Related U.S. Application Data

(63) Continuation of application No. 11/888,504, filed on Aug. 1, 2007, now Pat. No. 7,863,400.

(60) Provisional application No. 60/834,848, filed on Aug. 1, 2006.

(51) Int. Cl.
| | |
|---|---|
| *C08G 8/02* | (2006.01) |
| *C08G 14/00* | (2006.01) |
| *C08G 2/00* | (2006.01) |
| *C08G 4/00* | (2006.01) |
| *C08G 6/00* | (2006.01) |
| *C08G 10/00* | (2006.01) |
| *C08G 12/00* | (2006.01) |
| *C08G 16/00* | (2006.01) |
| *C08G 63/06* | (2006.01) |
| *C08G 63/66* | (2006.01) |
| *C08G 65/02* | (2006.01) |
| *C08G 79/02* | (2006.01) |

(52) U.S. Cl. ......... 528/125; 528/361; 528/398; 528/220

(58) Field of Classification Search .................. 528/361, 528/167; 524/123

See application file for complete search history.

(56) References Cited

U.S. PATENT DOCUMENTS

| | | | |
|---|---|---|---|
| 3,442,982 | A | 5/1969 | Friedman |
| 4,123,420 | A | 10/1978 | Kyo et al. |
| 4,719,279 | A | 1/1988 | Kauth et al. |
| 5,256,765 | A | 10/1993 | Leong |
| 5,290,836 | A | 3/1994 | Truyen |
| 5,326,900 | A | 7/1994 | Wuest et al. |
| 5,602,115 | A | 2/1997 | Nugent |
| 5,811,188 | A | 9/1998 | Huber et al. |
| 5,914,072 | A | 6/1999 | Zirnstein et al. |
| 6,043,305 | A | 3/2000 | Harris et al. |
| 6,288,210 | B1 | 9/2001 | Shobha et al. |
| 6,596,794 | B1 | 7/2003 | Eckel et al. |
| 6,861,499 | B2 | 3/2005 | Vinciguerra et al. |
| 7,067,083 | B2 | 6/2006 | Sekharipuram et al. |
| 7,265,166 | B2 | 9/2007 | Gebhard et al. |
| 2002/0052344 | A1 | 5/2002 | Leblanc et al. |
| 2003/0171463 | A1 | 9/2003 | Weinberg et al. |
| 2003/0225231 | A1 | 12/2003 | Hall |
| 2004/0002559 | A1 | 1/2004 | Troutman et al. |
| 2004/0044134 | A1 | 3/2004 | Selvaraj et al. |
| 2005/0222370 | A1 | 10/2005 | Freitag et al. |
| 2008/0139778 | A1 | 6/2008 | Takanishi et al. |

OTHER PUBLICATIONS

Ellzey, Ka. Deoxybenzoin-Based Polyarylates as Halogen-Free Fire-Resistant Polymers, Macromolecules, Apr. 14, 2006. vol. 39, pp. 3553-3556, ISSN 0024-9297.

*Primary Examiner* — Liam Heincer
(74) *Attorney, Agent, or Firm* — Reinhart Boerner Van Deuren s.c.

(57) ABSTRACT

Deoxybenzoin-phosphonate and other copolymer compounds, compositions and related methods.

20 Claims, No Drawings

US 8,158,742 B2

DEOXYBENZOIN-BASED ANTI-FLAMMABLE POLYPHOSPHONATE AND POLY(ARYLATE-PHOSPHONATE) COPOLYMER COMPOUNDS, COMPOSITIONS AND RELATED METHODS OF USE

This application is a continuation of and claims priority benefit from application Ser. No. 11/888,504 filed Aug. 1, 2007, issued as U.S. Pat. No. 7,863,400 on Jan. 4, 2011, which claimed priority benefit of application Ser. No. 60/834,848 filed on Aug. 1, 2006, each of which is incorporated herein by reference in its entirety.

BACKGROUND OF THE INVENTION

Although synthetic polymers are used extensively in society as plastics, rubbers, and textiles, the flammability of many polymers must be recognized as a safety hazard and an important challenge in polymer research. Flame retardants are incorporated into polymer materials as small molecule additives, or as part of the polymer backbone, to reduce flammability. A number of halogenated molecules, such as brominated aromatics, have been employed to reduce polymer flammability. Brominated aromatic flame retardants can be found in a wide-range of products, including computers, textiles, foam furniture, and construction materials. The environmental accumulation of halogenated flame retardants raises concerns that are restricting their use, and requires the development of nonhalogenated alternatives. In addition, some halogenated flame retardants release hydrogen halide gas upon combustion, which is especially undesirable in confined spaces, such as on aircrafts and ships. These concerns have led to an emphasis on nonhalogenated flame retardants in recent years. Some nonhalogenated flame retardant additives, such as alumina trihydrate, may compromise the physical and mechanical properties of polymers when loaded at high levels.

An ideal low-flammable polymer would be halogen-free and possess high thermal stability, low heat of combustion, and a low combustion heat release rate (HRR), with minimal release of toxic fumes. Intrinsically fire-resistant polymers that undergo significant carbonization upon heating are highly desirable, as carbonaceous char formation effectively averts combustion by producing an insulating layer on the polymer surface. Such char formation may also be realized from composite materials in which an additive ultimately provides the desired char.

The HRR of a material has been identified as a key characteristic of polymer flammability. Several calorimetry methods are available for measuring HRR during combustion, but these methods require relatively large sample quantities (~100 g per experiment) and depend on several factors including ignition source, ventilation, sample thickness, orientation, and edge characteristics. Walters and Lyon developed pyrolysis combustion flow calorimetry (PCFC) as a method to evaluate polymer flammability on very small sample quantities (milligrams). PCFC measures the heat of combustion of the fuel gases that are released by the pyrolysis of a solid in an inert gas stream. The fuel gases then mix with excess oxygen and completely oxidize at high temperature. The instantaneous heat of combustion of the flowing gas stream is then measured by oxygen consumption calorimetry. The heat release capacity (HRC), defined as the maximum amount of heat released per unit mass per degree Kelvin (J/g K), is viewed as an inherent material property and a good predictor of flammability. (See, R. E. Lyon and R. N. Walters, *J. Anal. Appl. Pyrolysis* 2004, 71, 27.) HRC values obtained by PCFC, across a range of many polymer types, are found to scale with the larger, conventional benchscale flammability experiments.

Aromatic polyesters prepared from bisphenols and phthalic acids are important high performance engineering thermoplastics. Conventional bisphenol A (BPA)-based polyarylates are well-known and widely used, but exhibit higher-than-desired flammability (e.g., BPA-polyarylates have HRC ~400 J/g K). Polyarylates containing 1,1-dichloro-2,2-bis(4-hydroxyphenyl)ethylene (bisphenol C, or BPC) are transparent and processable, and exhibit excellent mechanical and dielectric properties. BPC-based polymers are well within the "ultra fire-resistant" category (HRC<100 J/g K), with BPC-polyarylates and polycarbonates having reported HRC values of 21 and 29 J/g K, respectively, and high char yields (50-55%). However, the presence of halogen in BPC-based polymers, and the evolution of hydrogen chloride gas at elevated temperatures, remain concerns and may limit their adoption for scale-up and manufacturing as commodity materials.

BPC derivatives can be converted to the corresponding diphenylacetylene by loss of the chlorines, followed by phenyl migration. In BPC-containing polymers, this reaction represents a viable mechanism to char formation, in which the presence of chlorine sets up the rearrangement chemistry that leads to diphenylacetylene. In fact, diphenylacetylene-containing poly(aryl ether ketone)s showed heat release characteristics of similar magnitude to the corresponding BPC-versions. However, these alkyne-containing aromatic polymers are prone to side-reactions and crosslinking even at moderately high temperatures, and have less-than-optimal processibility and mechanical properties for many polymer materials applications. Accordingly, there is an ongoing search in the art for non-halogenated polymers or additives which promote charring and/or preclude combustion.

One approach has been the use of polyarylates incorporating a deoxybenzoin moiety, e.g., 4,4'-bishydroxydeoxybenzoin (BHDB), as a bisphenolic monomer. These polymers exhibited low combustion heat release rate and total heat of combustion, which is believed to arise from the thermally-induced conversion of BHDB to diphenylacetylene moieties that char by aromatization. See, K. A. Ellzey, T. Ranganathan, J. Zilberman, E. B. Coughlin, R. J. Farris, T. Emrick, *Macromolecules* 2006, 39, 3553. Pyrolysis combustion flow calorimetry (PCFC), an oxygen consumption technique for measuring heat release capacity (HRC), revealed exceptionally low HRC values for the BHDB-polyarylates (<100 J/g-K). (See, R. N. Walters, M. Smith, and M. R. Nyden, *International SAMPE Symposium and Exhibition* 2005, 50, 1118.) However, the rather low solubility of such polyarylate compounds limits their molecular weight and processibility. When bisphenol-A (BPA) and BHDB were used as co-bisphenols in the polyarylate synthesis, the solubility increased, but the flammability increased as well.

SUMMARY OF THE INVENTION

In light of the foregoing, it is an object of the present invention to provide one or more polymeric compounds and/ or method(s) for the use and preparation, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide one or more polymeric compounds exhibiting char formation rather than combustion or burn properties and/or low heat release capacities, as compared to non-halogenated anti-flammable polymers of the prior art.

It can be another object of the present invention, alone or in conjunction with the preceding objective, to provide one or more polymeric compounds providing increased solubility in commonly-used industrial or processing solvent systems.

It can be another object of this invention, alone or in conjunction with one or more of the preceding objectives, to provide one or more polymeric compounds of sufficient molecular weight and/or polydispersity, to afford such compounds commercially-useful mechanical properties.

Other objects, features, benefits and advantages of the present invention will be apparent from the summary and the following descriptions of certain embodiments, and will be readily apparent to those skilled in the art having knowledge of various flame retardant compounds and related synthetic techniques. Such objects, features, benefits and advantages will be apparent from the above as taken into conjunction with the accompanying examples, data, figures and all reasonable inferences to be drawn therefrom, alone or with consideration of the references incorporated herein.

In part, the present invention can comprise a compound of a formula

Such compounds can be terminated or end-capped as would be understood in the art, several representative, non-limiting moieties for which are as described elsewhere herein. In certain embodiments, R" and/or X can be phenyl or aryl. While certain such compounds are represented herein as phenyl (or aryl) unsubstituted, it will be understood by those skilled in the art that any such compound can comprise one or more substituents (e.g., linear or branched alkyl or substituted alkyl) on one or more phenyl/aryl (e.g., deoxybenzoin, phosphonate, phthaloyl, bisphenolic, etc.) moieties. Such substituents, as can also be provided with an alkyl moiety, include those known to those skilled in the art, as can be derived synthetically, or are available commercially, such substituents (e.g., without limitation fluoro, etc.) limited only by undue impact on low flammability, char and/or heat release capacity properties of the corresponding compounds and/or compositions thereof.

In certain embodiments (e.g., where m and m' are zero), such polymeric compounds can comprise at least about 40% to about 50% (by weight) phosphonate, such compounds exhibiting good heat release capacities and char yields. In certain other embodiments, regardless of molecular weight or value of m or m', phosphonate content can be tailored by choice of reagents and/or reaction conditions as needed for a particular end-use application. For instance, depending upon one or more monomeric components, phosphonate content is limited only by resulting compound solubility in a particular solvent or processing system, with consideration of desired flame-resistant properties.

In part, this invention can also comprise a compound of a formula

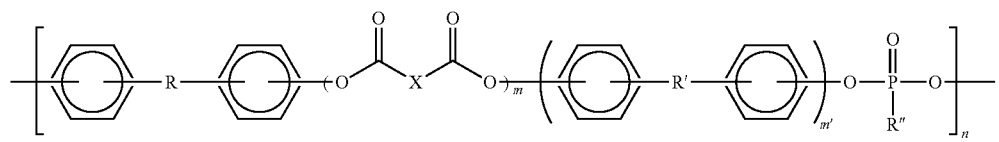

wherein R can be a C(O)C(R$_1$)(R$_2$) moiety, where R$_1$ and R$_2$ can be independently selected from H, alkyl and substituted alkyl; R' can be selected from C(O)C(R'$_1$)(R'$_2$), C(R'$_3$)(R'$_4$) and covalent bond moieties, where R'$_1$ and R'$_2$ can be independently selected from H, alkyl and substituted alkyl, and R'$_3$ and R'$_4$ can be independently selected from alkyl and substituted alkyl; R" can be selected from alkyl, substituted alkyl, phenyl and aryl moieties; X can be selected from alkyl, phenyl and aryl moieties; m and m' can be independently an integer selected from 0 and integers greater than 0; and n can be selected from 1 and integers greater than 1. While the polymer compounds of this invention can be random copolymers, such compounds can also be considered in the context of block copolymers with respect to any or more monomeric components.

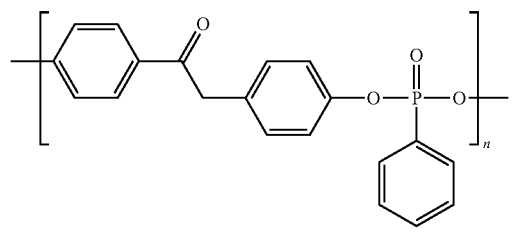

wherein, with reference to the preceding, m and m' are zero. Likewise, any such compound can comprise one or more substituents on one or more phenyl moieties, and one or more alpha-carbonyl substituents (i.e., R$_1$ and/or R$_2$) of the sort described above.

In part, consistent with various broader aspects of this invention, a composition of the sort contemplated herein can comprise any one or more of the preceding polymeric compounds and a fluid medium. In certain embodiments, such a compound is, at least in part, dispersible, immiscible and/or soluble in such a medium, such a medium as can comprise one or more organic solvents including but not limited to dichloromethane, tetrahydrofuran, dimethyl sulfoxide and dimethylformamide. Alternatively, one or more of the polymer compounds of this invention can be present or used in conjunction with a composite such as a plastic material or an article of manufacture such as but not limited to a textile, a building construction material or a furniture article; e.g., any such composition, composite, material and/or article as would be understood by those skilled in the art as could benefit from reduced flammability.

In part, the present invention can also be directed to a method of using phenylphosphonate monomer to affect one or more physical properties of a low flammability polymer compound. Such a method can comprise reacting at least one of deoxybenzoin monomers, other bisphenol monomers (e.g., bisphenol A, bisphenol C, etc.) and isophthaloyl monomers under conditions for monomer polymerization; and introducing a phenylphosphonate monomer into the reaction, in an amount at least partially sufficient to affect at least one of char yield, heat release capacity and solubility of any such polymerization product. In certain embodiments, as illustrated below, the phenylphosphonate monomer can be in an amount at least partially sufficient to increase the solubility of the polymerization product in a fluid medium, such a solubility as can be compared to that of a corresponding polymerization product absent phenylphosphonate monomer.

Regardless, depending upon monomer choice and/or weight percent of the resulting polymerization product, char yield can be greater than about 30%. In certain such embodiments, in such a method reacting monomers of a deoxybenzoin and an isophthaloyl and a phenylphosphonate, the char yield of a resulting polymerization product can be greater than about 40%. Regardless, as demonstrated below, the heat release capacity of such a product can be less than about 100 J/gK. Accordingly, phenylphosphonate monomer can be used, alone or in conjunction with deoxybenzoin monomer and/or isophthaloyl monomer, to tune solubility, thermal and decomposition properties of a polymeric compound designed therewith. Further refinement of such properties can be achieved through phenyl substitution of one or more phosphonate monomers and/or phenyl or α-ketone substitution of one or more deoxybenzoin or other bisphenolic monomers.

DETAILED DESCRIPTION OF CERTAIN EMBODIMENTS

The novel polymers of this invention can be illustrated by embodiments comprising polycondensation products of phenylphosphonic dichloride (PPDC) and BHDB, as depicted in Scheme 1, or of PPDC and another bisphenol, as described elsewhere herein (e.g., Scheme 2). Aromatic polyphosphonates based on PPDC exhibit excellent solubility and thermal stability. Polymers prepared from PPDC and BPA possess HRCs of ~350-500 J/g-K, in the moderate flammability category, and significantly above that of ultra-low HRC (<100 J/g-K) materials desired for use in transportation vehicles and enclosed spaces. Interfacial polymerization of BHDB (and other such monomeric components) and PPDC, using dichloromethane as the organic phase, and benzyltriphenyl phosphonium chloride as the phase transfer catalyst, proved convenient for the synthesis of BHDB-polyphosphonate (and other corresponding polymers) in good yield and at molecular weights affording useful mechanical properties. Following polymerization, the polyphosphonate was purified by precipitation into hexane, and isolated as a white solid. BHDB-PPDC polyphosphonates exhibit good-to-excellent solubility at room temperature in many solvents, including THF (70 mg/mL), chloroform (100 mg/mL), and DMF (400 mg/mL). Gel permeation chromatography (GPC) performed on DMF solutions (vs. polystyrene standards) of these BHDB-containing polyphosphonates prepared by interfacial polymerization provided estimated molecular weights ($M_w$) of ~20,000 g/mol, and polydispersity indices ($M_w/M_n$) of ~2.6.

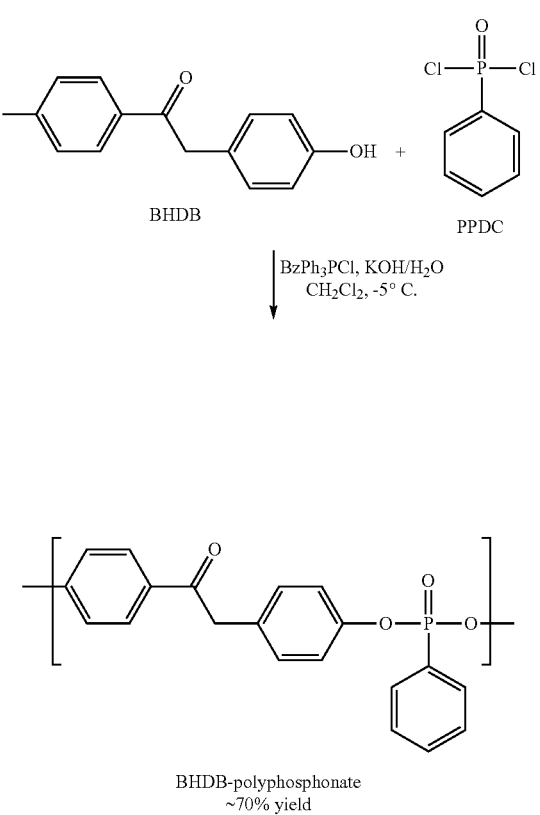

Scheme 1. Synthesis of BHDB-containing polyphosphonates by interfacial polycondensation.

$^{31}$P NMR spectroscopy performed on DMSO-$d_6$ solutions of BHDB-polyphosphonate gave a signal centered at 12.7 ppm, in the expected region for an aromatic phosphonate. Expansion of this region showed the presence of three overlapping resonances, which correspond to head-to-head, head-to-tail, and tail-to-tail isomers that are a consequence of the unsymmetrical nature of BHDB. The infrared spectrum of BHDB-polyphonate showed the expected signals at 1440 ($\nu_{P-C}$), 1270 ($\nu_{P=O}$), and 1204 cm$^{-1}$ ($\nu_{P-O-C}$), as well as a band at 1682 cm$^1$ arising from the carbonyl group. In the $^1$H NMR spectrum, the BHDB methylene resonance was seen at 4.3 ppm, while $^{13}$C NMR spectroscopy showed the expected resonances for the aromatic carbons, the carbonyl carbon at 197.1 ppm, and the BHDB methylene carbon at 44.6 ppm.

As referenced above, PCFC measures heat release capacity and total heat release of a polymeric material. Heat release capacity is the peak heat release rate normalized to the heating rate, determined by oxygen consumption methods. (See, e.g., Lyon, supra.) PCFC analysis of the BHDB-polyphosphonate revealed exceptionally low HRC values of <100 J/g-K. These HRC values are superior to those of many known polymers already in the anti-flammable category, such as polyvinylidene fluoride (311 J/g-K), polyphenylene sulfide (165 J/g-K), polyetheretherketone (155 J/g-K), polyphenylsulfone (153 J/g-K), polyetherimide (121 J/g-K), and polyethersulfone (115 J/g-K). Polymers in the ultra-low flammability category, such as bisphenol-C polyether (16 J/g-K), poly (ether ether ketone) (96 J/g-K), and polybenzimidazole (36 J/g-K) are either halogenated, or possess the characteristically low solubility of rigid aromatic polymers.

As mentioned above, compounds of this invention can also include various copolymers comprising one or more bisphenolic and diacid chloride monomeric components. For instance, as shown in Scheme 2, below, random or block copolymers can be prepared with BHDB (1) and various ratios of isophthaloyl chloride (2) and PPDC (3). Likewise, such a reaction sequence can be used to introduce various other monomeric components (e.g., 4,4'-biphenol where R', above, is a covalent bond) into the copolymer compounds. For instance, with respect to the reaction portrayed in Scheme 2 or any other polymer of this invention, the phthaloyl starting material can be para-substituted. Such compounds, representative of various other copolymers of this invention, also show good flame-resistant properties.

Scheme 2

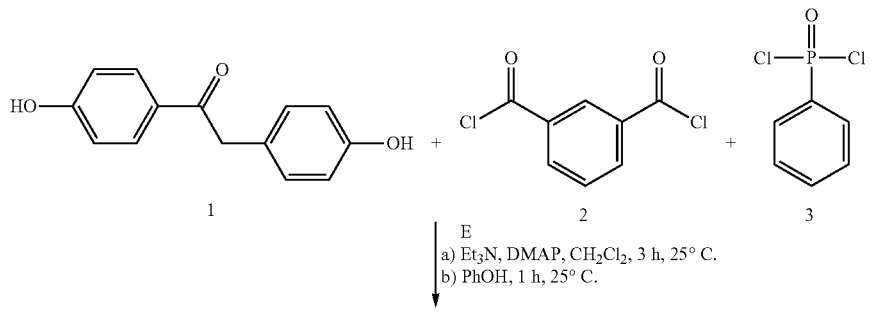

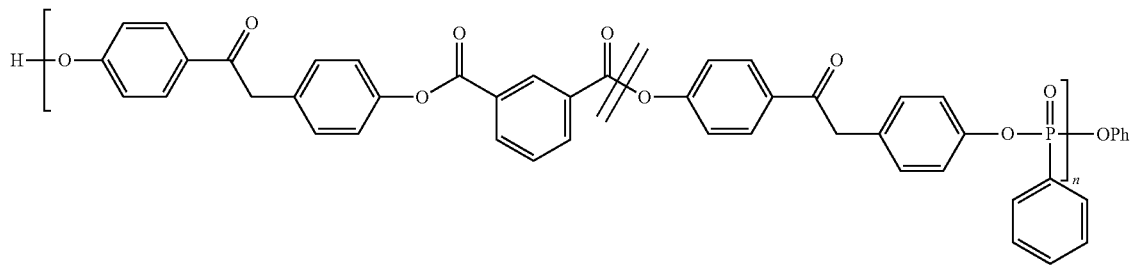

Deoxybenzoin-containing poly(arylate-co-phosphonate)s, shown as 4 in Scheme 2, were synthesized by solution polycondensation of BHDB with isophthaloyl chloride and PPDC at a variety of ratios. As discussed below, the reactions were carried out in anhydrous dichloromethane at room temperature, using triethylamine as base, and 4-N,N-dimethylaminopyridine (DMAP) as catalyst. In the late stages of the polymerization, phenol was added to end-cap the polymer, converting the labile P(O)—Cl chain-ends to the more hydrolytically stable P—(O)—OPh groups. Isolated yields of polymer 4, following precipitation into acetone, ranged from 80 to 95%, and the products were soluble in common organic solvents, such as chloroform, dichloromethane, DMSO, and DMF. Copolymer solubility was found to increase with mole percent phosphonate in the backbone, and gel permeation chromatography (GPC)-estimation of molecular weight (DMF as eluent) generally showed non-limiting weight-average molecular weights ($M_w$) over 50 kDa, and polydispersity indices (PDIs) around 2 (Table 1). Higher molecular weights for the phosphonate-containing polymers were always seen relative to the wholly arylate backbone, most likely because of better solubility of the former that prevents termination of the polymerization by precipitation.

TABLE 1

Monomer Feed Ratios, Incorporation into Copolymer, Isolated Yields, and GPC-Estimated Molecular Weights for BHDB-Containing Arylate-Phosphonate Copolymers

| Isophthaloyl Chloride:PPDC (Molar Ratios) | | | GPC[a] | | |
|---|---|---|---|---|---|
| Feed | Incorporated[b] | Yield (%) | $M_w$(g/mol) | $M_n$(g/mol) | PDI |
| 100:0 | 100:0 | 80 | 15,100 | 11,700 | 1.29 |
| 80:20 | 77:23 | 88 | 65,600 | 37,000 | 1.78 |
| 60:40 | 57:43 | 85 | 50,700 | 28,500 | 1.78 |
| 50:50 | 46:54 | 95 | 54,600 | 24,100 | 2.27 |
| 40:60 | 39:61 | 92 | 83,700 | 31,200 | 2.69 |
| 20:80 | 23:77 | 90 | 61,000 | 37,000 | 1.65 |
| 0:100 | 0:100 | 89 | 92,700 | 41,000 | 2.26 |

[a]GPC performed using DMF as eluent, and molecular weights estimated against polystyrene calibration standards.
[b]Calculated by integration of $^1$H NMR spectra.

The poly(arylate-co-phosphonate)s prepared as shown in Scheme 2 were characterized by NMR ($^1$H, $^{31}$P, and $^{13}$C) and FTIR spectroscopy (spectra not shown). $^1$H NMR spectroscopy on DMSO-$d_6$ solutions of copolymer 4 showed overlapping resonances at 4.3, 4.4, and 4.5 ppm, representing protons of the BHDB methylene group in the copolymer. The multiple signals arise from the different connectivities of BHDB in random copolymers of monomers 1-3. The signal at 4.3 ppm is assigned to the unit in which BHDB is attached to two phosphonate groups. The signal at 4.5 ppm represents the unit in which BHDB is attached to two isophthalate groups, whereas that at 4.4 ppm corresponds to the BHDB moiety with phosphonate on one side and isophthalate on the other. $^{31}$P NMR spectroscopy confirmed the presence of phenylphosphonate in the backbone, with a signal centered at 12.7 ppm. This peak actually consists of three overlapping resonances (12.64, 12.70, and 12.74 ppm), attributed to the three possible connections of the unsymmetrical BHDB about the phenylphosphonate group. In the $^{13}$C NMR spectrum of polymer 4, BHDB signals at from 196.2-196.4 ppm (carbonyl) and 43.7-43.9 ppm (methylene) were found, as were the remaining expected aromatic and carbonyl resonances. The Fourier Transform infrared spectrometry (FTIR) spectra of 4 showed strong bands for isophthalate moieties at 1738 cm$^{-1}$ (carbonyl stretching of the ester linkage), phosphonate ($v_{P=O}$=1272 cm$^{-1}$ and $v_{P-O-C}$=1200 cm$^{-1}$), and the deoxybenzoin ketone ($v_{CO}$=1683 cm$^{-1}$).

The flammability characteristics of BHDB-containing poly(arylate-co-phosphonate) 4 were examined by PCFC, and the HRC values obtained are reported in Table 2. The HRC of the BHDB-based polyarylate and polyphosphonate homopolymers were ~65 and ~80 J/g K, respectively. Interestingly, all of the poly(arylate-co-phosphonate) copolymers exhibited even lower HRC values than seen for either homopolymer. The copolymer containing ~4:1 arylate:phosphonate had a measured HRC of ~50 J/g K, whereas the polymers with the lowest HRC values, ~30-40 J/g K, contained a nearly 1:1 arylate:phosphonate ratio. Although this might suggest an optimum monomer ratio for obtaining low flammable polymer materials, all of the copolymers reported in Table 2 exhibit desirably low HRC values.

TABLE 2

Flammability and Thermal Characterization of BHDB-Copolymers (4)

| | | TGA | | DSC |
|---|---|---|---|---|
| Isophthaloyl Chloride:PPDC (Molar Ratios) | PCFC Heat Release Capacity (J/g K) | 5% Weight Loss Temperature (° C.) | Char Yield at 800° C. (%) | Glass Transition Temperature (° C.) |
| 100:0 | 65 ± 5 | 340 | 45 | 157 |
| 77:23 | 48 ± 4 | 346 | 50 | 142 |
| 57:43 | 41 ± 3 | 383 | 56 | 133 |
| 46:54 | 36 ± 2 | 367 | 54 | 131 |
| 39:61 | 40 ± 3 | 390 | 57 | 124 |
| 23:77 | 59 ± 5 | 394 | 55 | 110 |
| 0:100 | 80 ± 10 | 397 | 52 | 100 |

The BHDB-containing poly(arylate-co-phosphonate) copolymers are thermally stable up to 350-400° C., at which stage ~5% weight loss is observed by thermogravimetric analysis (TGA). All of these copolymers showed high char yield (>50%) at 800° C. (Table 2), with the arylate-phosphonate copolymers having slightly higher char yields than the respective homopolymers (in agreement with the HRC results). The flammability characteristics of the BHDB-copolymers are comparable with that of commercial polyimide (Kapton), an ultrafire resistant material, which exhibited HRC of 25 J/g K and char yield of 52%. With regard to meta versus para substitution patterns within a copolymer structure, use of a para-substituted monomer, such as terephthaloyl chloride, is feasible although the more highly rigid para-linked polymers are less soluble than the mew-substituted versions illustrated in Scheme 2. Further, the use of such para-substituted monomers may result in higher flammability, as compared to the meta-substituted versions, as observed for instance in Kevlar® (i.e., a para-linked aromatic polyamide), versus Nomex® (i.e., a meta-linked aromatic polyamide) materials.

Several phosphorus-based flame retardants, such as aryl phosphates and phosphonates, phosphine oxides, and phosphonic acids are known to promote char through a condensed phase mechanism, whereas some examples show an additional vapor phase activity. Phosphorous-based flame retardants undergo thermal oxidative reactions, enhanced by the presence of oxygen-rich polymers, to form phosphoric acid, which catalyzes char formation. At high temperatures, the phosphoric acid is converted to the strongly dehydrating polyphosphoric acid, which can decompose into a polyphosphate glass $[(PO_3)_n]$, n-coating of the polymer surface, an effective flame barrier.

A condensed phase mechanism that lowers HRC in the phosphorus-containing BHDB-polyphosphonate, relative to the BHDB-polyarylates, is believed to be operational here. This effect appears to be exclusive to the BHDB case, as BPA-polyphosphonates actually give lower char yields (~23%) than BPA-polyarylates (~30%). Without limitation to any one theory or mode of operation, the higher oxygen content of BHDB-poly(arylate-co-phosphonate)s, because of the isophthalate and BHDB moieties, may be responsible for the highest char yields and lowest HRC values of all the polymers reported here. Moreover, pyrolysis GC/MS of these polymers, indicated that no phosphorous-containing compounds were present in the volatile decomposition products of BHDB-polyphosphonate. In contrast, BPA-polyphosphonate yielded phosphorus-based volatile products as the major decomposition product.

DSC studies of these BHDB-copolymers revealed glass transition temperatures ($T_g$) ranging from 100° C. for the BHDB-polyphosphonate to 157° C. for the BHDB-polyarylate (Table 2). These glass transition temperatures were found to be reversible during cooling scans. None of these polymers reported here exhibited melting temperatures or crystallization temperatures when the heating runs were carried out up to 300° C. The BHDB-copolymers, especially those containing ≧50 mol % isophthalate units, can potentially be considered for high performance engineering plastics that require low flammability, as these polymers couple relatively high glass transition temperatures (above 130° C.) with their inherently fire-resistant properties. BPA-Containing Poly(arylate-co-phosphonate)s For comparative purposes, the arylate-phosphonate copolymers described previously for BHDB were also prepared by using BPA (compound 5, Scheme 3) by similar solution polycondensation. Molecular weight, thermal, and flammability data for these polymers (6) are given in Table 3.

Scheme 3

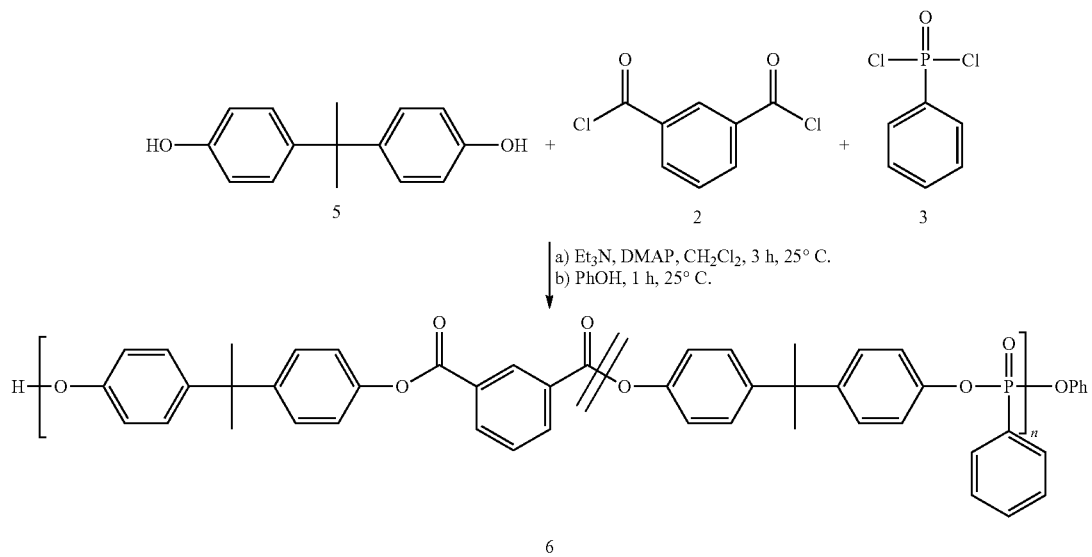

TABLE 3

Properties of BPA-Poly(arylate-co-phosphonate)s (6)

| Isophthaloyl Chloride:PPDC | | | GPC[a] | | | PCFC | TGA | DSC |
|---|---|---|---|---|---|---|---|---|
| Feed | Actual[b] | Yield (%) | $M_w$ (g/mol) | $M_n$ (g/mol) | PDI | HRC (J/g K) | Char Yield (%)[c] | Tg (° C.) |
| 100:0 | 100:0 | 85 | 137,500 | 66,800 | 2.06 | 385 ± 20 | 30 | 183 |
| 80:20 | 77:23 | 87 | 113,000 | 83,000 | 1.38 | 415 ± 25 | 30 | 160 |
| 65:35 | 67:33 | 80 | 173,900 | 113,200 | 1.54 | 595 ± 65 | 35 | 133 |
| 50:50 | 53:47 | 92 | 143,000 | 103,000 | 1.40 | 710 ± 70 | 31 | 137 |
| 20:80 | 26:74 | 85 | 82,400 | 61,400 | 1.51 | 480 ± 45 | 24 | 116 |
| 0:100 | 0:100 | 95 | 73,000 | 48,500 | 1.51 | 440 ± 25 | 23 | 115 |

[a]GPC was performed using DMF as eluent, and molecular weights were estimated against polystyrene standards.
[b]Calculated by integration of 1H NMR spectra.
[c]At 800° C.

PCFC studies of the BPA-based copolymers indicated their moderately high flammability characteristics, with HRC values ranging from 400 to 700 J/g K. Unlike the BHDB case, for the BPA-homopolymers the substitution of isophthalate units with phenylphosphonate led to reduced char yields (<25%). For the copolymers, the presence of the phosphonate groups led to slightly increased char yield, possibly because of the presence of the oxygen-containing isophthalate in the copolymer backbone. In case of the present BHDB-copolymers, the presence of both BHDB and isophthalate oxygen-containing units function to increase the char yield and also reduce the HRC values upon incorporation of phosphonate groups. The opposite is seen in the BPA-based copolymers, where higher HRC values are observed.

Experiments were conducted to optimize the BHDB-PPDC polycondensation in an effort to obtain higher molecular weights than achieved by the interfacial method described above. The hydrolytic instability of PPDC may limit the effectiveness of the interfacial method, whereas solution polymerization of polyphosphonates can be conducted effectively under anhydrous conditions, as shown in the literature for BPA-containing polyphosphonates. (See H. K. Shobha, H. Johnson, M. Sankarapandian, Y. S. Kim, P. Rangarajan, D. G. Baird, and J. E. McGrath, *J. Polym. Sci. Polym. Chem.* 2001, 39, 2904.)

In a typical solution polymerization, a 0.15 M dichloromethane solution of BHDB (1 equiv), anhydrous triethylamine (2.5 equiv) and (4-dimethylamino) pyridine (DMAP, catalytic amount) were stirred at −5° C. To this solution was added a dichloromethane solution of PPDC (1 equiv), and the mixture was allowed to warm to room temperature, where it was stirred for 30 minutes. As the polycondensation reached high conversion, phenol or 2,6-dimethylphenol was added as an end-capping agent (Table 4). The reaction mixture was then washed with water, and precipitated into cold hexane, to give the BHDB-containing polyphosphonate as a white solid in ~80% isolated yield. GPC-estimated the polyphosphonates prepared by solution polycondensation to have molecular weights in the range of about 50,000 to about 150,000 g/mol. The use of DMAP as an acylation catalyst proved beneficial, and the end-capping agents effectively converted labile R—P(O)—Cl chain-ends into more stable R—P(O)—OPh groups. The higher molecular weight BHDB-polyphosphonates prepared by solution polymerization were also soluble in many common organic solvents, with spectroscopic features (e.g., $^{31}P$, $^{1}H$, and $^{13}C$ NMR, and FT-IR) identical to the samples prepared by interfacial polymerization.

PCFC studies of these polymers indicated HRC values of ~80-100 J/g-K, in accord with the molecular weight independent nature of this analytical technique for polymer samples. TGA results (~5% weight loss at 350° C.; ~50% char yield) were also independent of the preparative method. This solution polymerization was run on a 20 gram scale without difficulty; higher scale solution polymerizations can be feasible.

TABLE 4

Solution polymerization of BHDB and PPDC

| End-capping Agent | Reaction Time (h)[a] | Yield (%) | GPC[b] | | |
|---|---|---|---|---|---|
| | | | $M_w$ (g/mol) | $M_n$ (g/mol) | PDI |
| 2,6-Me$_2$PhOH | 0.5 | 79 | 54000 | 24000 | 2.3 |
| 2,6-Me$_2$PhOH | 1 | 75 | 116000 | 40000 | 2.9 |
| 2,6-Me$_2$PhOH | 2 | 78 | 140000 | 46000 | 3.1 |
| 2,6-Me$_2$PhOH | 4 | 86 | 55000 | 23000 | 2.4 |
| Phenol | 2 | 75 | 138000 | 46000 | 3.0 |
| Phenol | 3 | 79 | 165000 | 44000 | 3.8 |
| Phenol | 5 | 80 | 52000 | 22000 | 2.6 |
| Phenol[c] | 3 | 75 | 5000 | 1900 | 2.6 |
| None | 3 | 77 | 75000 | 23000 | 3.3 |

[a]Reaction mixture stirred 1 hour after adding end-capping agent;
[b]DMF as eluent against polystyrene standards;
[c]without catalyst.

As demonstrated, the A$_2$ bisphenol BHDB has been shown to be, in the context of this invention, a versatile monomer in polycondensation chemistry, with potential application to many new polymer materials. The present polyarylate-phosphonate copolymer compounds can be understood, at least in some embodiments, as combining the highly desirable property of flame-resistance with good solution processibility over a range of molecular weights. The presence of phosphonate units in the polymer backbone serves to improve solubility over arylate homopolymers, and also promote char formation and low HRC. These results suggest BHDB-based copolymers as potentially useful high-performance polymers in applications where low flammability is required.

EXAMPLES OF THE INVENTION

The following non-limiting examples and data illustrate various aspects and features relating to the compounds and/or methods of the present invention, including the preparation of a range of anti-flammable polyphosphonate compounds comprising various monomeric components as are available through the synthetic methodologies described herein. In comparison with the prior art, the present compounds and/or methods provide results and data which are surprising, unexpected and contrary thereto. While the utility of this invention is illustrated through the use of several compounds and monomeric components incorporated therein, it will be understood by those skilled in the art that comparable results are obtainable with various other polymeric compounds and monomeric components, as are commensurate with the scope of this invention.

Materials: 4,4'-Bishydroxydeoxybenzoin (BHDB) was synthesized by demethylation of desoxyanisoin. (See, K. Ellzey, T. Ranganathan, J. Zilberman, E. B. Coughlin, R. J. Farris, and T. Emrick, *Macromolecules* 2006, 39, 3553, the entirety of which is incorporated herein by reference.) Isophthaloyl chloride, benzyltriphenylphosphonium chloride, potassium hydroxide, 4-dimethylaminopyridine (DMAP), 2,6-dimethylphenol and phenol were purchased from Sigma-Aldrich and used as received. Phenylphosphonic dichloride (PPDC) was purchased from Acros Organics and purified by distillation under vacuum. Dichloromethane was washed with sulfuric acid and distilled over calcium hydride. Triethylamine was dried and distilled over calcium hydride.

Characterization: The $^1$H, $^{13}$C and $^{31}$P NMR spectra were recorded using a Bruker Avance400 spectrometer operating at the appropriate frequencies using either residual CDCl$_3$ or DMSO-d$_6$ as internal reference (for $^1$H and $^{13}$C) or 85% H$_3$PO$_4$ as external reference (for $^{31}$P). Infrared spectra were obtained on a Perkin Elmer Spectrum One FT-IR spectrometer equipped with an ATR accessory. Molecular weight and polydispersity index were measured by gel permeation chromatography (GPC) in DMF at 50° C. with a flow rate of 1 mL/min on systems equipped with two-column sets (from Polymer Laboratories), and refractive index detectors (HP 1047A). Polystyrene standards were used for molecular weight calibration. Flammability characteristics of the polymers, such as heat release capacity and total heat release, were measured using Pyrolysis Combustion Flow calorimetry (PCFC) using sample sizes of 1-5 mg. The samples were pyrolyzed in nitrogen to 900° C., at a rate of 1° C./s, followed by complete combustion at 900° C. Char yields were determined by weighing the sample before and after the test. Thermogravimetric analysis (TGA) was done on a DuPont TGA 2950 in nitrogen atmosphere at the heating rate of 10° C. min$^{-1}$. Glass transition temperature (Tg) data was collected during the second heating from room temperature. Differential scanning calorimetry (DSC) measurements were performed on a DuPont Instruments DSC 2910 at a scan rate of 10° C./min under a flow of nitrogen (50 mL/min).

Example 1

Synthesis of BHDB-polyphosphonate by interfacial polymerization. BHDB (1 g, 4.4 mmol) was dissolved in 10 mL of 1M aqueous potassium hydroxide solution. To this was added benzyltriphenylphosphonium chloride (34 mg, 0.1 mmol) and the resulting solution was cooled to about −10° C. in an ice/ethanol bath. A pre-cooled (−20° C.) solution of phenylphosphonic dichloride, PPDC (0.86 g, 0.66 mL, 4.4 mmol) in 10 mL of anhydrous dichloromethane was added dropwise over a 10 minute period, with vigorous mechanical stirring (following PPDC addition, an additional 10 mL dichloromethane was used to rinse PPDC residues from the syringe). The reaction mixture was then stirred for 2 hours at −5 to −10° C., diluted with 100 mL dichloromethane, and washed with cold water (3×10 mL). The organic layer was dried over anhydrous magnesium sulfate, then concentrated and poured into 500 mL of stirred cold hexane to give a white fibrous precipitate. This solid was collected by filtration, washed with hexane and dried under vacuum at 60° C. to afford the product. Yield: 1.1 g (70%); FT-IR (powder): 1682 ($v_{C=O}$), 1440 ($v_{P-C}$), 1270 ($v_{P=O}$), 1204 ($v_{P-O-C}$) cm$^{-1}$. $^{31}$P {$^1$H} NMR (121 MHz, DMSO-d$_6$): δ 12.64, 12.69, 12.74 ppm. $^1$H NMR (400 MHz, DMSO-d$_6$, ppm): δ 4.33 (s, 2H), 7.12 (d, 2H, 7.2 Hz), 7.21 (d, 2H, 6.8 Hz), 7.38 (d, 2H, 7.6 Hz), 7.59 (m, 2H), 7.7 (m, 1H), 7.93 (m, 2H), 8.03 (m, 2H). $^{13}$C NMR (100 MHz, DMSO-d$_6$, ppm): δ 197.1, 154.4, 149.4, 134.9, 133.1, 132.3, 131.6, 130.3, 130.0, 127.4, 125.6, 121.4, 121.1, 44.6. GPC (DMF) against polystyrene standards: M$_w$=23000 (PDI=2.6) Comparative data illustrating use of alternate catalyst reagents is provided in Table 5.

TABLE 5

GPC and PCFC data for BHDB-Polyphosphonates prepared by interfacial polycondensation with various catalysts

| Catalyst | GPC (Solvent-DMF; Standards-Polystyrene) | | | HR capacity (J/g · K) |
| --- | --- | --- | --- | --- |
| | M$_w$ | M$_n$ | PDI | |
| Cetyltrimethylammoinum bromide | 13000 | 5000 | 2.7 | 73 |
| Tetra-n-butylammonium bromide | 4000 | 1300 | 2.9 | 95 |
| Benzyltriphenylphosphonium chloride | 23000 | 8600 | 2.6 | 81 |

Example 2

Synthesis of BHDB-polyphosphonate by solution polymerization. In a flame-dried 2-neck round-bottom flask attached to an addition funnel, BHDB (1 g, 4.4 mmol) was dissolved in 20 mL of anhydrous dichloromethane and 1.5 mL (1.11 g, 11 mmol) of anhydrous triethylamine. To this was added DMAP (15 mg, 0.01 mmol) and the flask was cooled to about −5° C. using ice/ethanol bath. PPDC (0.86 g, 0.66 mL, 4.4 mmol) in 10 mL of anhydrous dichloromethane was taken in the addition funnel and added drop-wise with vigorous stirring. After the addition over about 5 min, the reaction mixture was brought to room temperature and stirred for 3 h. The end-capping agent, phenol (42 mg, 0.5 mmol) was then added, and stirring was continued for an additional hour. After this, about 250 mL of dichloromethane was added to the reaction mixture. The dichloromethane solution was washed with cold water (5×30 mL), dried over anhydrous magnesium sulfate, concentrated to about 20 mL, then precipitated into a stirred solution of cold hexane (~500 mL) to get a white fibrous solid. This was filtered, washed with hexane, and dried under vacuum overnight at 60° C. to provide the desired product (Yield: 79%).

Example 3

Synthesis of BHDB-Poly(arylate-co-phosphonate) 4. In a dry round-bottom flask equipped with an addition funnel and mechanical stirrer was added a solution of BHDB (1.0 g, 4.4 mmol) in anhydrous dichloromethane (16 mL) and anhydrous triethylamine (1.5 mL, 1.1 g, 11 mmol). To this was added DMAP (15 mg, 0.01 mmol), and the flask was cooled to −5° C. using an ice/ethanol bath. A solution of PPDC (0.60 mL, 2.2 mmol) and isophthaloyl chloride (0.45 g, 2.2 mmol) in anhydrous dichloromethane (10 mL) was added dropwise by addition funnel to the vigorously stirring reaction mixture over 5 min. The reaction mixture was then allowed to warm to room temperature and stirred there for 3 h. The endcapping agent, phenol (45 mg, 0.5 mmol) was added, and stirring was continued for 1 h. Then, the reaction mixture was diluted with dichloromethane (250 mL), washed with cold water (5×40 mL), dried over anhydrous magnesium sulfate, concentrated to a volume of about 20 mL, and precipitated into a stirred solution of cold acetone (~500 mL) to get white fibrous solid. The solid was filtered, washed with acetone, and dried in a vacuum oven at 60° C. to give 1.45 g of a white solid (95% yield).

FTIR (powder, cm$^{-1}$): 1738 ($v_{C=O(O)}$), 1683 ($v_{C=O}$), 1443 ($v_{P-C}$), 1272 ($v_{P=O}$), 1200 ($v_{P-O-C}$). $^{31}$P {$^1$H} NMR (121 MHz, DMSO-d$_6$, ppm): δ 12.64 (s), 12.70 (s), 12.74 (s). $^1$H NMR (400 MHz, DMSO-d$_6$, ppm): δ 4.33, 4.42, 4.50 (s, 2H), 7.1-7.38 (m, 6H), 7.56 (m, 2H), 7.72 (m, 1H), 7.95 (m, 4H), 8.45 (m, 2H), 8.8 (m, 1H). $^{13}$C NMR (100 MHz, DMSO-d$_6$, ppm): δ 43.7, 43.8, 43.9, 120.2, 121.3, 122.4, 123.1, 127.8, 128.2, 128.5, 130.9, 131.5, 132.9, 133.2, 134.9, 136.2, 148.3, 149.9, 154.3, 154.9, 163.4, 164.5, 196.2, 196.3, 196.4 ppm.

Example 4

Synthesis of BPA-Poly(arylate-co-phosphonate) 6. Polymer 6 was prepared as described for 4, using BPA (1.0 g, 4.4 mmol), triethylamine (1.5 mL, 11 mmol), DMAP (15 mg, 0.01 mmol), PPDC (0.60 mL, 2.2 mmol), and isophthaloyl chloride (0.45 g, 2.2 mmol) in anhydrous dichloromethane (25 mL). The dichloromethane solution of the polymer, after washing with water, was precipitated into a stirred solution of cold hexane to afford 1.4 g of a white fibrous solid (92% yield).

FTIR (powder, cm$^{-1}$): 1739 ($v_{C=O(O)}$), ($v_{P-C}$), 1297 ($v_{P=O}$), 1194 ($v_{P-O-C}$) cm$^{-1}$. $^{31}$P {H} NMR (162 MHz, CDCl$_3$, ppm): δ 12.5 (s). $^1$H NMR (400 MHz, CDCl$_3$, ppm): δ 1.58, 1.66, 1.74 (s, 6H), 7.09 (m, 6H), 7.16 (m, 5H), 7.25 (m, 3H), 7.34 (m, 2H), 7.50 (m 2H), 7.59 (m, 1H), 7.67 (m, 1H), 7.96 (m, 2H), 8.45 (m, 2H), 9.0 (m, 1H). $^{13}$C NMR (100 MHz, CDCl$_3$, ppm): 30.9, 30.95, 31.0, 42.3, 42.5, 42.6, 120.0, 121.0, 127.9, 128.1, 128.6, 128.7, 130.4, 132.3, 133.2, 134.9, 147.1, 148.2, 148.6, 148.7, 164.3.

Example 5

Synthesis of BPA-polyphosphonate utilized the same procedures as described for BHDB-polyphosphonate. Yield: 79%. FT-IR (powder): 1440 ($v_{P-C}$), 1271 ($v_{P=O}$), 1199 cm$^{-1}$ ($v_{P-O-C}$) cm$^{-1}$. $^{31}$P NMR (121 MHz, CDCl$_3$): δ 12.48 ppm. $^1$H NMR (400 MHz, CDCl$_3$, ppm): δ 1.56 (s, 6H), 7.0-7.1 (m, 8H), 7.46 (m, 2H), 7.57 (m, 1H), 7.95 (m, 2H). $^{13}$C NMR (100 MHz, CDCl$_3$, ppm): δ 148.2, 147.4, 134.2, 134.9, 134.1, 132.5, 129.5, 128.4, 127.8, 125.7, 120.5, 120.3, 42.2, 30.7. GPC (DMF as eluent) against polystyrene standards: M$_w$=42200 (PDI=2.40).

Example 6

Other polymeric compounds can be prepared, in accordance with this invention. For instance, various other bisphenolic monomeric components can be used, such components limited only by commercial or synthetic availability and contribution to desired flame-resistance, solubility and/or end-use application. Without limitation, a range of α-ketone substituted BHDB monomers can be prepared as described in Ellzey, supra, at 3556-57, the entirety of which is incorporated herein by reference. Such derivatives can be used alone or in conjunction with one or more other BHDB or other bisphenolic monomers to adjust the solubility of the resulting polymer. Likewise, phenyl or alkyl substitution of one or more phosphonate monomers can also be used to tune solubility, processibility and/or other mechanical properties, such substitution without regard to position and limited only by available reagent(s) or synthetic technique.

We claim:

1. An article of manufacture comprising a polymer compound of a formula

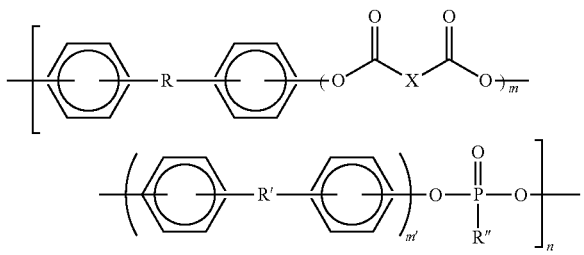

wherein R is a C(O)C(R$_1$)(R$_2$) moiety, where R$_1$ and R$_2$ is independently selected from H, alkyl and substituted alkyl; R' is selected from C(O)C(R'$_1$)(R'$_2$), C(R'$_3$)(R'$_4$) and covalent bond moieties, where R'$_1$ and R'$_2$ is independently selected from H, alkyl and substituted alkyl, and R'$_3$ and R'$_4$ is independently selected from alkyl and substituted alkyl; R" is selected from alkyl, substituted alkyl, phenyl, substituted phenyl, aryl and substituted aryl moieties; X is selected from alkyl, substituted alkyl, phenyl, substituted phenyl, aryl, and substituted aryl moieties; m and m' are integers selected from 0 and 1, provided one of m and m' is 0 when the other is 0; and n is selected from 1 and integers greater than 1.

2. The article of claim 1 wherein m and m' are 0, and R$_1$ and R$_2$ are H.

3. The article of claim 2 comprising a phosphonate component ranging from about 30 wt. % to about 60 wt. % thereof.

4. The article of claim 1 wherein m and m' are 1.

5. The article of claim 4 where X is a phenyl moiety and R' is selected from C(O)C(R'$_1$)(R'$_2$) moieties.

6. The article of claim 5 wherein R' is a C(O)CH$_2$ moiety.

7. The article of claim 1 selected from a textile, a building construction material and a furniture article.

8. A composition comprising a polymer comprising the polycondensation product of a deoxybenzoin monomer with phthaloyl and phosphonate monomers, said deoxybenzoin monomer selected from monomers of a formula

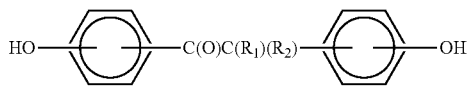

wherein R$_1$ and R$_2$ are independently selected from H, alkyl and substituted alkyl moieties and combinations of said monomers; said phthaloyl monomer is selected from alkyl, substituted alkyl, phenyl, substituted phenyl, aryl and substituted aryl phthaloyl monomers and combinations of said monomers; and said phosphonate monomer is selected from alkyl, substituted alkyl, phenyl, substituted phenyl, aryl and substituted aryl phosphonate monomers and combinations of said monomers.

9. The composition of claim 8 comprising a random copolymer.

10. The composition of claim 8 comprising a block copolymer.

11. The composition of claim 8 wherein $R_1$ and $R_2$ are H.

12. The composition of claim 8 comprising a phosphonate monomer component ranging from about 30 wt. % to about 60 wt. % thereof.

13. The composition of claim 8 wherein said phthaloyl monomer is selected from phenyl and substituted phenyl phthaloyls; and said phosphonate monomer is selected from phenyl and substituted phenyl phosphonates.

14. The composition of claim 8 comprising the polycondensation product of at least one said phthaloyls and said phosphonates, and a bisphenolic monomer selected from monomers of a formula

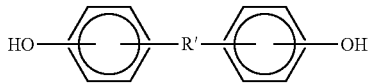

wherein R' is selected from $C(R'_3)(R'_4)$ moieties and a covalent bond, where $R'_3$ and $R'_4$ are independently selected from alkyl and substituted alkyl moieties and combinations of said monomers.

15. The composition of claim 14 comprising a random copolymer.

16. The composition of claim 14 comprising a block copolymer.

17. The composition of claim 14 wherein R' is a $C(CH_3)_2$ moiety.

18. The composition of claim 8 comprising a fluid medium.

19. A composition comprising a polymer compound of a formula

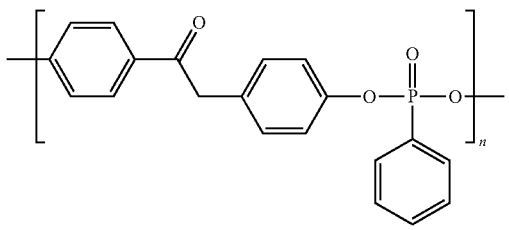

wherein n is an integer corresponding to the molecular weight of said compound; and a fluid medium.

20. The composition of claim 19 wherein said fluid medium comprises an organic solvent.

* * * * *